July 17, 1934.   G. A. LYON   1,966,453

PROCESS OF MAKING AUTOMOBILE BUFFERS AND SIMILAR ARTICLES

Original Filed Jan. 30, 1925    5 Sheets-Sheet 1

INVENTOR
GEORGE ALBERT LYON
BY
Newell & Spencer
ATTORNEYS

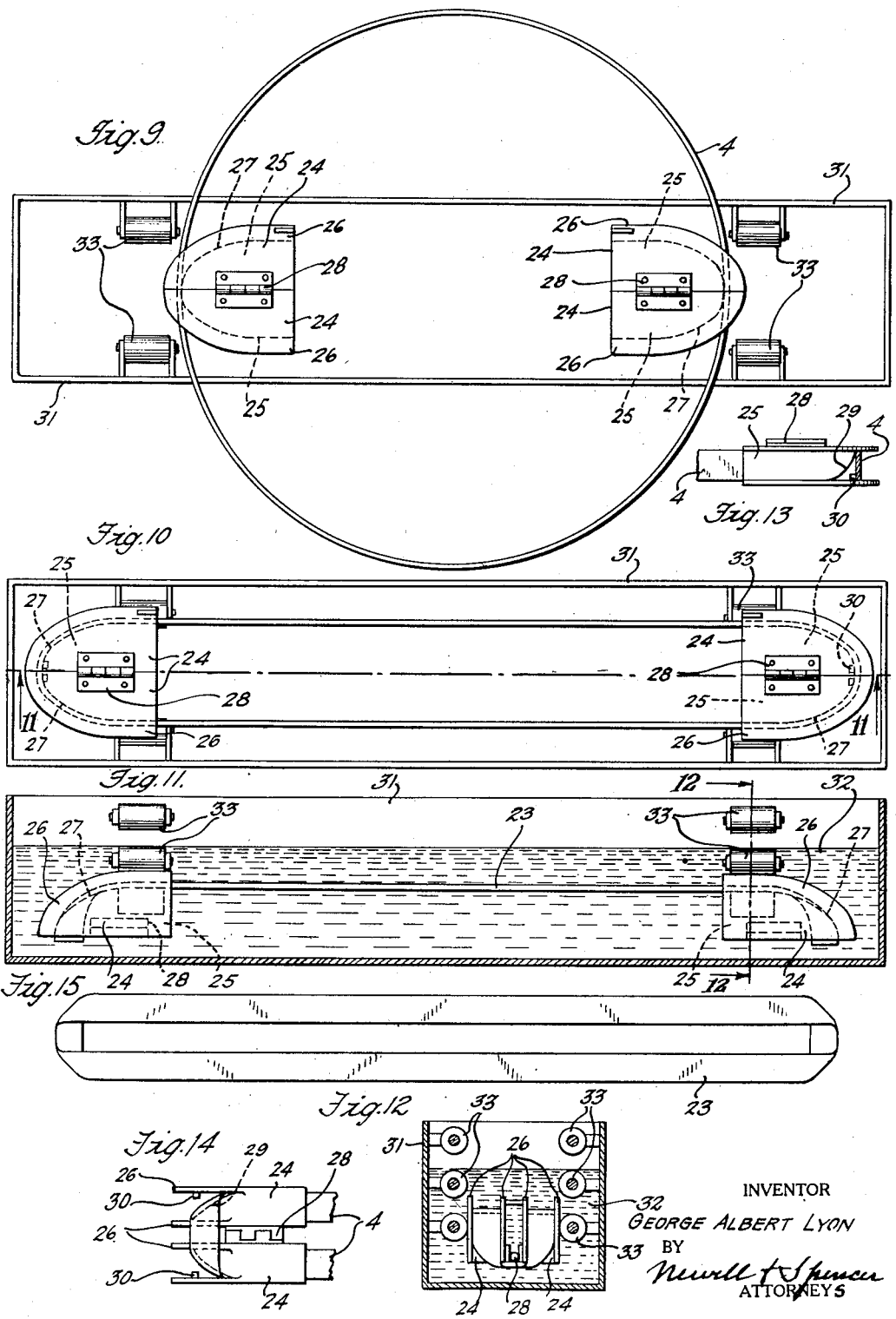

July 17, 1934.   G. A. LYON   1,966,453
PROCESS OF MAKING AUTOMOBILE BUFFERS AND SIMILAR ARTICLES
Original Filed Jan. 30, 1925    5 Sheets-Sheet 3
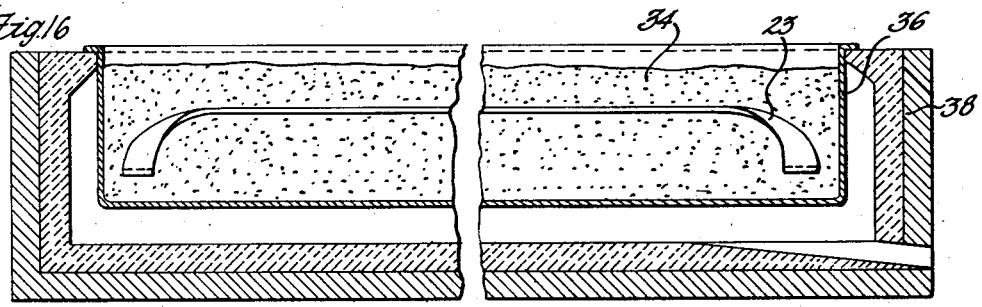
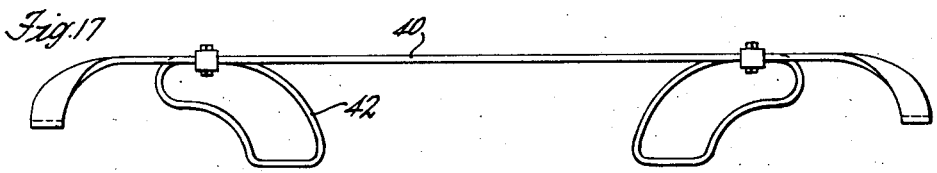
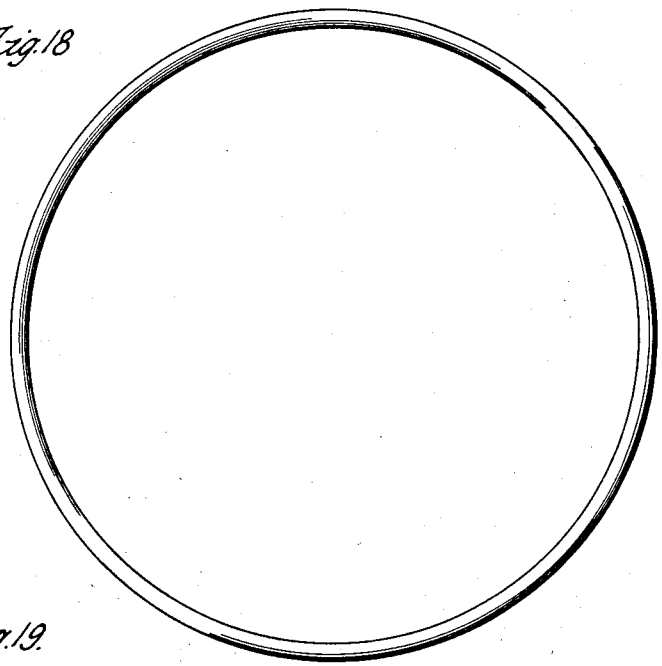
INVENTOR
GEORGE ALBERT LYON
BY
ATTORNEYS July 17, 1934.   G. A. LYON   1,966,453
PROCESS OF MAKING AUTOMOBILE BUFFERS AND SIMILAR ARTICLES
Original Filed Jan. 30, 1925   5 Sheets-Sheet 4

INVENTOR
GEORGE ALBERT LYON
BY
ATTORNEYS

July 17, 1934. G. A. LYON 1,966,453
PROCESS OF MAKING AUTOMOBILE BUFFERS AND SIMILAR ARTICLES
Original Filed Jan. 30, 1925 5 Sheets-Sheet 5
Fig. 26
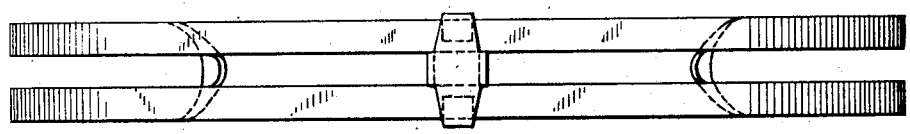
Fig. 27
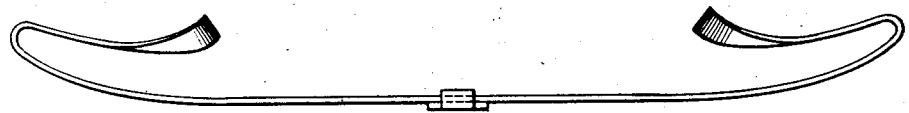
Fig. 30 Fig. 31
 
Fig. 32 Fig. 33
 
Fig. 34
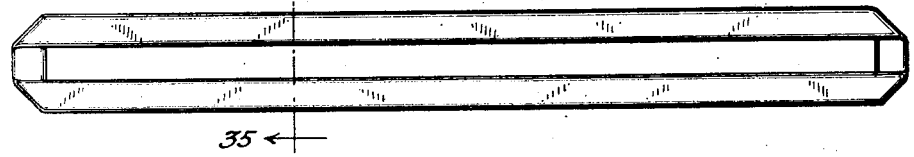
Fig. 35 Fig. 28
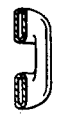 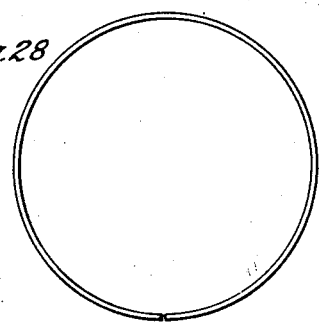
Fig. 29
INVENTOR
GEORGE ALBERT LYON
BY
Newell & Spencer
ATTORNEYS Patented July 17, 1934

1,966,453

UNITED STATES PATENT OFFICE 1,966,453

PROCESS OF MAKING AUTOMOBILE BUFFERS AND SIMILAR ARTICLES

George Albert Lyon, Allenhurst, N. J.

Application January 30, 1925, Serial No. 5,818
Renewed February 11, 1932

26 Claims. (Cl. 29—152)

This invention relates to a process of manufacture of automobile buffers and similar metallic articles.

In the manufacture of automobile buffers and similar articles, certain surfaces are finished and plated with nickel to give a highly attractive appearance to the finished buffer. The grinding, buffing and polishing of these surfaces to prepare them for the reception of the nickel coating, the plating of the surfaces and the buffing and polishing after plating, have heretofore been performed with the material in a form such that these operations have taken a great deal of labor and time, and have been important factors in the cost of manufacture of the buffers. These operations cannot be performed with the greatest efficiency at the early stages in the manufacture of the buffer when the material is in bar or strip form. The performing of these operations at this time has an added disadvantage when heating of the material is required in bending the same into final shape, on account of the injury to the plated surface produced by the heat treatment. It has been unsatisfactory to perform these operations after the material has been bent into final buffer shape, on account of the inaccessibility of certain parts of the buffer to the finishing tools. When this has been done, it has often been the practice to plate the entire surface of the buffer and to leave the parts of the metal coating, which are inaccessible to the buffing or polishing tools, in a rough condition, or to cover these parts of the surface with enamel.

The primary object of the present invention is to produce a process of manufacture of automobile buffers and the like, by which various operations required in the manufacture of the buffer may be performed more rapidly and efficiently than in processes heretofore followed, and the cost of manufacture of buffers correspondingly reduced.

With these and other objects in view, a process has been developed in which the material, before being presented to the finishing tools and to the plating mechanism, is reduced to a condition such that all parts of the same are readily accessible to the tools, and that the operations may be performed on the material progressively and continuously with a resultant high efficiency in these operations.

The various features of the invention will be clearly understood from the accompanying drawings illustrating somewhat diagrammatically various steps which may be followed in making an automobile buffer in accordance with the present process and the following detailed description of said process.

As to common subject matter, the present application is a continuation of my co-pending application, Serial No. 745,432, filed October 23, 1924, Automobile buffer and process of making the same.

In the drawings:

Fig. 9 is a plan view of a mechanism which may be employed in the forming and quenching operations, this view showing the ring in place with relation to this mechanism just before the initial forming operation is performed;

Fig. 10 is a view similar to Fig. 9, showing certain of the parts in different positions;

Fig. 11 is a longitudinal sectional view of the mechanism shown in Fig. 10, taken substantially on the line 11—11 of said figure and showing certain of the parts in different positions;

Fig. 12 is a sectional view taken substantially on the line 12—12 of Fig. 11;

Fig. 13 is a detail sectional view illustrating the construction of the forming shoes shown in Figs. 9 to 12, inclusive;

Fig. 14 is an underside plan view of one of the pairs of forming shoes with the shoes in the relative positions shown in Figs. 11 and 12;

Fig. 15 is a view illustrating the final form of the buffer, shaped as illustrated in Figs. 9 to 14, inclusive;

Fig. 16 is a view illustrating the step of tempering the buffer after it has been bent into its final shape;

Fig. 17 is a view illustrating a buffer of the form shown in Fig. 15 with certain intermediate brackets for securing the buffer to the chassis of an automobile;

Fig. 18 illustrates a ring made from a bar of substantially circular cross section, from which ring another form of buffer may be shaped in accordance with the present process;

Fig. 19 illustrates a double bar buffer made by certain shaping operations from the ring shown in Fig. 18;

Figs. 26 and 27 illustrate respectively, in front elevation and in plan, still another form of buffer similar to that shown in Fig. 15, but having its ends inturned as clearly shown in Fig. 27;

Fig. 28 illustrates a ring made from a bar rolled into ring form without welding the ends of the ring in making another form of buffer in accordance with the present process;

Fig. 29 is a view in front elevation of a buffer made from the ring shown in Fig. 28;

Figs. 30 and 31 illustrate respectively, in end elevation and in front elevation, a section of tubular stock which may be employed in the manufacture of still another form of buffer;

Figs. 32 and 33 are similar views showing the stock illustrated in Figs. 30 and 31 after having been subjected to a rolling operation;

Fig. 34 is a view in front elevation of a buffer made from the stock shown in Figs. 32 and 33; and Fig. 35 is a sectional view taken substantially on the line 35—35 of Fig. 34.

Figure 1:
Fig. 1 illustrates a piece of strip steel from which the buffer is to be formed.

In making a buffer of the type herein disclosed by the novel process of the present invention as preferably carried out, a steel bar or strip, such as that shown in Fig. 1, of the desired cross-sectional dimension and of the length required to make a buffer of the illustrated design, is employed. This bar is formed of untempered and unhardened stock and is rolled while cold into the form of a ring, indicated at 4, before receiving any treatment to fit it for use as a buffer. It will be understood, of course, that various compositions of steel may be used, and that the particular composition constitutes no part of the present invention. The expressions "ring" or "ring form" are not necessarily to be understood to mean a perfect circular ring, and may include other rotatable shapes. The untempered and unhardened condition of the stock enables the same readily to be plastically formed or molded into a ring formation.

Figure 2:
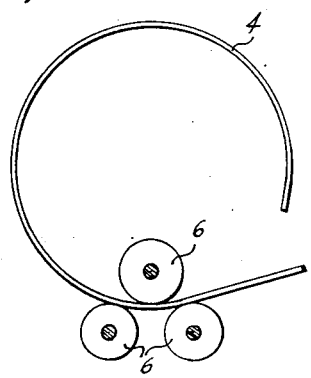
Fig. 2 illustrates diagrammatically the manner in which the strip is bent into ring form.

The rolling operation, if carried out in the usual manner with a three-roller bending machine, as shown in Fig. 2, will usually result in the formation of a slightly flat portion at each end of the strip, for reasons clearly understood by those skilled in the art. These flat portions may be given the curvature of the rest of the ring, if desired, either by a power press operation or by other suitable means. This is, however, not essential in making the form of buffer herein shown and described. In the drawings only the bending rollers 6 of the bending machine are illustrated, this diagrammatic showing being sufficient to give a clear understanding of the operation.

Figure 3:
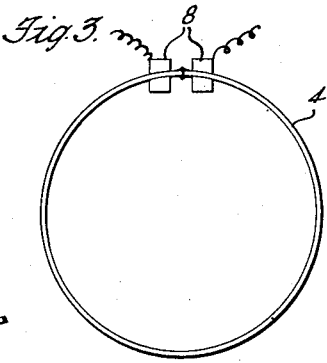
Fig. 3 illustrates the step of electrically welding the ends of the strip after it has been flexed into ring form.
Figure 4:
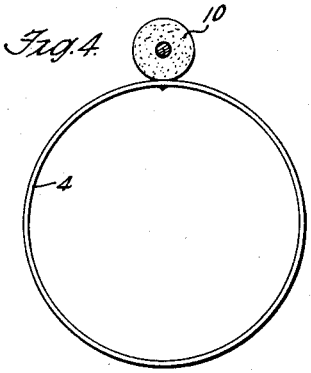
Fig. 4 illustrates the step of reducing the weld approximately to the cross-sectional dimensions of the remainder of the strip.

The strip having been rolled into ring form, the ends of the strip are electrically welded together, as illustrated in Fig. 3, and then the flash is preferably removed while the weld is still hot, by means of a mechanically operated chisel. In Fig. 3 the portions of the ring adjacent the ends are shown as engaged by electric terminals 8 for the circuit, which furnishes the welding current. Any of the flash that the chisel does not remove may be taken off by applying the welded portions of the ring to an emery or other grinding wheel 10, as shown in Fig. 4.

An incidental result of forming the bar into a ring while cold is that the greater part of the mill scale which may be on the bar will flake off, since this scale is decidedly brittle and does not flex as readily as the material of the bar. The flaking off of this scale on the raw bar during the cold-bending operation avoids the necessity for pickling or sand blasting the material before the polishing operation by which the surface is prepared for plating, and also eliminates the extra labor and time which would be required in removing the scale by the action of the polishing wheels during the first part of the polishing operation. This scale is of a very high degree of hardness, and the removal of the same before the polishing of the surface of the metal greatly facilitates the polishing operation.

Figure 5:
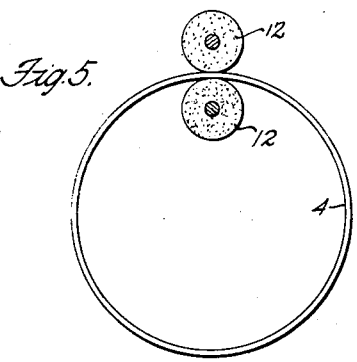
Fig. 5 illustrates one method of surface grinding the strip after it is formed into a ring.

In polishing the ring preparatory to plating same, both the inner and outer faces of the strip may be ground or buffed simultaneously by rotating the ring between revolving polishing or buffing wheels 12, as shown in Fig. 5, or the outer face may be polished or buffed if only one face of the buffer is to be finished. For polishing the rings when they are cold rolled, it has been found that cloth or felt wheels covered with glue and emery are particularly suitable, the initial polishing being preferably done dry with three different grades of emery, and the finish polishing being done with the same fine grade of emery as the last polishing step, except that a grease bond is preferably used for the finishing step. This results in the production of a very highly polished surface, which is advantageous in securing an electro-deposition of nickel, chromium or other plating metals.

The edges of the ring may be polished or buffed in substantially the same manner by rotating the ring between polishing or buffing wheels with the edges of the ring in contact with the wheels.

Figure 6:
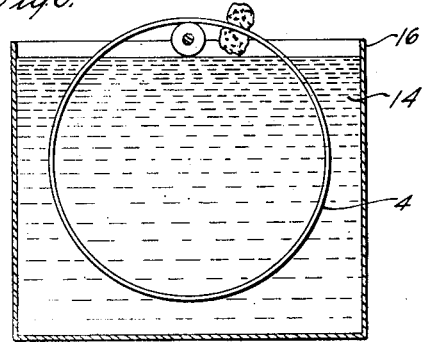
Fig. 6 illustrates one method of plating the strip while it is in ring form.

After the polishing and buffing of the ring, the surface is thoroughly cleansed to remove all traces of grease or other foreign matter before the ring is placed in the plating bath. The surface of the ring having been suitably prepared for the plating operation, the operation is preferably carried out in the following manner. The ring is preferably suspended in a plating solution 14 contained in a tank 16, so that the greater part of it is immersed in the solution and only a small segment exposed to the air, as shown in Fig. 6 of the drawings, the ring being rotated so that successive parts are exposed to the air while the parts previously exposed are reentering the solution. This permits any bubbles of hydrogen liberated in the bath and adhering to the ring, to pass off or to be dislodged as they emerge into the air, thus insuring the formation of a coating which is more ductile than that produced by some of the other coating processes, and is readily buffed to close the pores and form a smooth surface with a high polish. Preferably a relatively heavy coat of the plating metal is deposited on the ring to secure the results desired in the later buffing operation.

Figure 7:
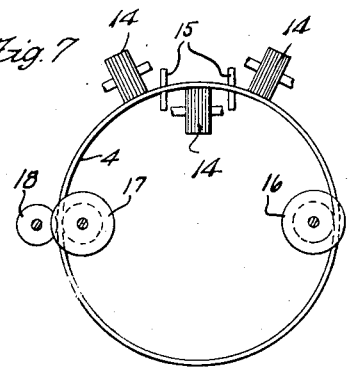
Fig. 7 is a view illustrating the step of buffing the rings after the plating operation.

In the buffing operation which follows the plating of the ring, the ring is preferably buffed by rotating the same between rotating buffing wheels 14, as shown in Fig. 7 of the drawings. In polishing the ring, substantially all striae or lines on the surface are formed longitudinally of the periphery of the ring. To facilitate the elimination of these lines in the finished surface of the plating, the buffing wheels are preferably arranged to move in directions transverse to the ring at their points of contact with the ring. The spreading of the metal produced by the buffing operation will then tend to eliminate these lines. As shown in Fig. 7, the ring rests on guides 15 between the buffing wheels and is supported between flanges on a guide roll 16 and flanges on the guide and feed roll 17. A second feed roll 18 is arranged to cooperate with the guide and feed roll 17 to grip the ring between them, and one or both of these rolls may be rotated to feed the ring rotatably past the buffing wheels. The outer buffing wheels are preferably fixed and the inner buffing wheel is preferably movable toward and from the outer wheels, and is arranged to exert pressure on the ring during the buffing operation.

On account of the ring form of the material, the buffing operation may be rapidly performed with great thoroughness and efficiency, the metal being subjected seevral times to the action of the buffing wheels, and the operation being continuous.

After the buffing of the ring has been completed, the ring is then ready for shaping operations to be performed on the ring to reduce the same to the final buffer shape. The shape of the ring may require the heating of the same in order to reduce the metal to the proper condition to be readily bent into the desired form.

In heating the ring to avoid discoloration of the nickel, or other plating or oxidation of the same at high temperatures, which would result from heating it in an ordinary furnace, the ring is heated in oxygen free surroundings and is coated with a protective coating before exposure to the air to prevent oxidation. In the preferred method followed in practising the invention, the heating is performed in a bath of suitable salts having a melting point and a volatilization point such as to insure the desired degree of heat while the bath remains in a liquid condition, the material of the bath being also of such character that it will adhere to the metal surface when the metal is removed from the heating bath. Various materials may be selected for use in the heating bath, the particular composition varying, of course, somewhat with the desired degree of heat to which the metal is to be raised. Materials suitable for this purpose are barium salts, calcium salts, sodium chloride, sodium carbonate, or suitable mixtures of these or other salts to produce the required temperatures.

The unhardened and untempered stock which is preferably used in the present process, consists of medium carbon steel, and in heating this steel preliminary to bending the same into the desired shape, the steel is heated to a temperature between 1400° and 1550° F. This requires, of course, a selection of the proper salt bath to subject the material to this temperature. By heating the steel to this temperature, it is physically changed to a condition in which it may be readily bent into the shape of the finished buffer, and the steel may be efficiently hardened by quenching the same after the bending operation in a suitable quenching bath. By immersing the ring in a salt bath of the character above described while it is being heated, the heating of the ring is performed in oxygen free surroundings, and thereby oxidation of the surface of the metal during the heating operation is avoided. Furthermore, when the ring is withdrawn from the bath, a protective film of the material of which the bath is composed adheres to the surface thereof and protects the article from oxidation while it is exposed to the air and while the bending operations are being performed.

Figure 8:
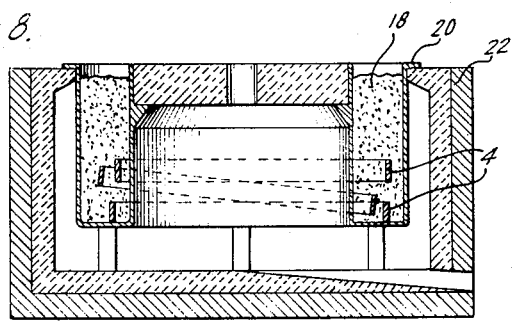
Fig. 8 illustrates the manner in which the finished and plated rings are heated preparatory to the forming operations.

The finished and plated rings may be efficiently heated to the desired temperature in a suitable bath, in the manner shown in Fig. 8. As shown in this figure, the rings are immersed in a heating bath 18 contained in a ring-shaped pot 20 set into a crucible 22. This crucible may be heated by oil, gas, or other suitable fuel to reduce the bath 18 in the pot to the desired temperature.

The plated and polished ring having been heated in the liquid bath, it is removed from the bath with a film of the bath substance adhering to its surface and thus protecting it from oxidation or discoloration from the action of the air, and is then shaped or bent into the desired form, preferably by placing the ring in a bending machine designed to shape the ring into this form. In producing buffers of the various forms shown in the drawings, the shaping of the ring into the final buffer form may be effected in various ways. In making an end fold automobile buffer of the form shown in Fig. 15 of the drawings and indicated at 23, a simple and efficient method of bending the ring into this form is herein shown, in which the ring is elongated by gripping the opposite sides thereof, and as it is elongated the ends are folded over substantially simultaneously by a combined twisting and bending action, which brings the sides of the elongated band into substantially edgewise parallelism, and produces the form of buffer illustrated in this figure.

This operation of shaping the buffer may be performed so rapidly that the heat lost is relatively small. Moreover, heat losses are reduced appreciably by reason of the coating of the material of the bath, and also by reason of the plating. If plated with nickel which has a low radiation constant, this, as just suggested, will reduce somewhat the radiation losses.

In view of the small heat losses, the metal may be and, in the present application of the process, is maintained at a temperature suitable for hardening until the completion of the bending operation, when preferably it is immersed in the quenching bath to harden the same. The buffer, preferably while still held in the mechanism by which it is bent into buffer shape, is immersed in the quenching bath, this mechanism being preferably designed to hold the buffer against distortion during the quenching operation. The quenching bath may consist of water, oil or other suitable material, the bath employed depending upon the steel composition of the stock from which the buffer is manufactured. Where medium carbon steel containing about 0.50% of carbon is employed, the steel is preferably quenched in a water bath. Steel of this character enables a strong weld to be produced, and requires a relatively low pressure to roll from bar or strip form into a ring. A water hardening bath, which may be employed with steel of this composition, has the advantage that the salts adhering to the metal upon immersion in the hardening bath are instantly removed from the metal. When high carbon steel containing around 0.90% of carbon is used, the steel is preferably quenched in oil.

The operation of shaping the buffer may be performed efficiently in the manner illustrated in Figs. 9 to 13, inclusive. As shown in these figures, the ring 4 is engaged at diametrically opposite points by forming shoes 24 secured together in pairs. These forming shoes are provided with abutment blocks 25 for engagement with the interior surface of the ring and with marginal flanges 26 between which the ring is engaged. The abutment blocks 25 are formed with suitably curved contact faces 27 to give the desired curvature to the portions of the ring engaging the same when the ring is elongated. The ring is applied to the forming shoes in the manner illustrated in Fig. 9, and either one or both pairs of forming shoes are moved to carry the pairs of shoes away from each other and thereby elongate the ring into the form shown in Fig. 10. As shown in the drawings of this application, both pairs of forming shoes are moved to produce this relative movement of the shoes.

To enable the ring not only to be elongated by the forming shoes but also to be bent and folded to form an end fold buffer, the forming shoes of each pair are hinged together at 28, thereby enabling the shoes to be turned into substantially parallel planes, as shown in Figs. 11, 12 and 14. The forming blocks 25 are each cut away at their outer points to form inclined surfaces 29 over which the ring is bent in forming the end fold of the buffer as the forming shoes are swung into parallel relations. As the forming shoes are moved away from each other in elongating the ring, the ring is held in position opposite the point at which the forming blocks are cut away by means of lugs 30 formed on the lower flanges 26 and arranged to engage the ring in the manner shown in Fig. 13.

The forming shoes when the ring is placed in position to be engaged thereby, are located sufficiently close together to enable the ring to be placed over the same. When the forming shoes move outwardly at the beginning of the operation to engage the ring, the ring is centered automatically on the shoes.

The forming shoes are preferably arranged over a tank 31 containing water, oil or other fluid for quenching the buffer after the forming operations. After the forming shoes have operated to elongate the ring and to bend the same into the desired buffer form, the shoes are moved downwardly to carry the buffer into the quenching tank. In the construction shown in the drawings, the forming shoes are moved relatively into substantially parallel relations as the shoes are carried downwardly into the quenching tank by means of rollers 33 mounted on the sides of the tank, which engage the forming shoes in the manner shown in Figs. 11 and 12. As the shoes are swung into substantially parallel positions, the ring 4 slips off the lugs 30 and engages the inclined surfaces 29, the material being bent over these surfaces and over the edges of the lower flanges 26, as shown in Figs. 11, 12 and 14.

When the ring 4 has been heated to the required temperature, it is placed on the forming shoes, as shown in Figs. 9 and 10, and the forming shoes are then moved away from each other, thereby engaging and centering the ring and then elongating the ring into substantially the form shown in Fig. 10.

In placing the ring in position to be engaged by the forming shoes, the weld is preferably located at a point where the metal is bent to the least degree during the shaping operation in order that the welded point may be subjected to a minimum of strain. To this end the ring is located so that the weld will be placed at or adjacent the central part of one of the contact faces 27. The shoes are then moved downwardly into the forming tank, thereby causing the rollers 33 to swing the shoes of each pair into substantially parallel relations to form the end folds on the buffer. The buffer is bent into the desired form before it is carried into the quenching bath 32, and the continued movement of the forming shoes carries the buffer down into the bath, as shown in Figs. 11 and 12. During the quenching operation, the buffer is held under heavy tension by the forming shoes. This counteracts any tendency to distortion, due to the heavy internal stresses to which the material is subjected while it is being quenched. The forming shoes are separated during the forming operation, preferably by a yielding force which is sufficiently heavy to produce the results described, and maintains the material under heavy tension throughout the forming and quenching operation. This result may be secured by interposing a heavy coiled spring between one or both pairs of forming shoes, and the devices for moving the pairs of shoes away from each other.

After the bending operation the pairs of bending shoes are first moved relatively toward each other, and are then moved upwardly together to carry the shoes with the formed buffer resting thereon out of the quenching bath. The movement of the shoes toward each other will disengage at least one of the folds at the ends of the buffer from the corresponding shoe, so that the buffer may be readily removed from the shoes.

The sudden chilling of the coating of material of the heating bath causes the instantaneous removal thereof from the metal, and the surface of the metal is thus substantially freed of the adherent layer of the bath substance.

In order to temper or reduce the hardness of the metal of the buffer and still protect the surface finish thereof, the buffer is heated in an oxygen-free atmosphere to tempering heat, and is provided with a protective coating to prevent oxidation when exposed in a heated condition to the atmosphere. In accordance with the preferred manner of carrying out the present process, the buffer is placed in another bath of liquid material, as shown in Fig. 16, this material being selected to enable the buffer to be subjected to the desired temperature for properly tempering the steel. In the case of medium carbon steel, a temperature of between 600° and 800° F. is ordinarily required in this operation. This bath, like the preceding heating bath, protects the surfaces from oxidation, and the buffer may be left in the bath as long as tempering practice has shown to be necessary. Moreover, this bath, like the heating bath, is made from materials selected to provide an adherent coating when the article tempered is removed from the bath, so that when exposed to the air, while still heated to the tempering heat, it will not be oxidized or otherwise discolored. As shown in Fig. 16, the buffer indicated at 23 is immersed in the bath 34 of material of the character described above for heating the buffer to the proper temperature for tempering the steel. This bath 34 is contained in a pot 36 inserted in a crucible 38, adapted to be heated by oil, gas or other suitable fuel.

If found for any reason to be advantageous, the metal may, before the bending operation, be heated in a bath merely to a temperature sufficiently high to reduce the metal to the proper condition for efficient bending of the same, and after the bending operation the metal may be heated in another bath to hardening temperature and quenched. The simplest and most efficient manner of applying the present process, however, is to combine the heating for bending of the metal and the heating for hardening of the metal in one operation.

Salts of the character sold under the trade name of "Bellis Lavite" or "Lavite" may be employed in the heating, hardening and tempering operations, or any of the salts or other substances mentioned above, or combinations of the same found suitable for the temperatures required and also having the other qualities referred to, may be used. "Lavite" baths are produced in different grades or compositions for use in heating steel to the different temperatures stated above which are required for bending, hardening and tempering the steel.

The buffer, after it is removed from the tempering bath and while still coated with the material of the bath, is allowed to remain in the atmosphere until it reaches a temperature of say 200° F. or slightly more, and it is then dipped into water and the adherent coating of bath material removed, leaving the surface clean and ready for the final buffing operation.

From the foregoing it will be seen that at all stages in the fabrication or heat treatment of the article, where it is heated to such temperatures as tend to cause it rapidly to oxidize if exposed to an oxygen containing atmosphere, the surfaces are covered by a layer of adhesive material chemically inert, and thus oxidation of the surfaces is prevented.

In the process above described, the polishing operations to prepare the metal for plating, the plating operation and the buffing operation after the plating of the metal are all performed while the metal is in ring form. This is highly important, since all surfaces of the metal when in ring form are readily accessible to the operating tools, and the operations may be performed with rapidity and efficiency by rotating the ring in any of these operations to transfer the point of operation about the ring. Furthermore, each of these operations may be performed continuously on the metal while it is in ring form until the operation is completed, so that the metal surfaces may be subjected a number of times to the action of the devices for operating on the same without loss of time. Thus the metal surfaces may be treated with thoroughness and efficiency and with a minimum expenditure of labor and time.

Fig. 17 of the drawings illustrates a buffer 40 of substantially the same form as that illustrated in Fig. 15, and brackets 42 for supporting the buffer in the proper position upon the chassis of an automobile. The brackets 42 consist of continuous metallic bands which are secured between the upper and lower bars of the buffer by means of suitable securing plates and bolts. The brackets 42 are provided at least upon certain portions thereof with finished surfaces which preferably are plated in order to give an attractive appearance to the entire buffer assembly. These brackets may be made from strip stock bent into ring form and welded, finished, plated, heated, formed, hardened and tempered in a manner similar to that described above in the manufacture of an automobile buffer. Small size buffers or "bumperettes" may be made in a similar manner.

Figs. 18 and 19 illustrate the manner in which another form of buffer made from bar stock of circular cross-section may be manufactured in accordance with the present process. This buffer may be made of bar stock of circular cross-section, bent into ring form, as shown in Fig. 18, and afterwards operated upon as described above except as to the bending or forming operation. The forming operation will differ from that above described, in that, to shape the buffer into final form shown in Fig. 19, it is only necessary to elongate the ring shown in Fig. 18.

Figure 20:
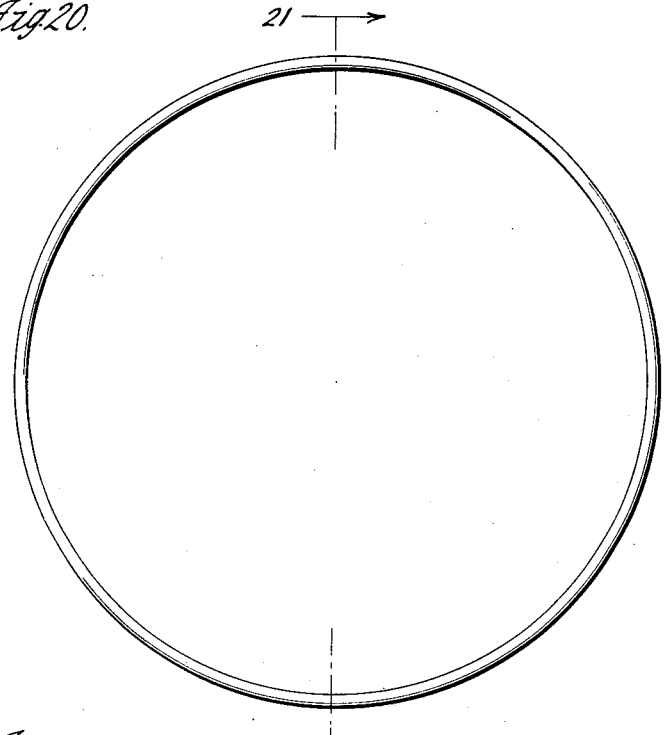
Fig. 20 illustrates a ring made from a bar or strip having roll edges in the manufacture of another form of buffer in accordance with the present process.
Figure 21:
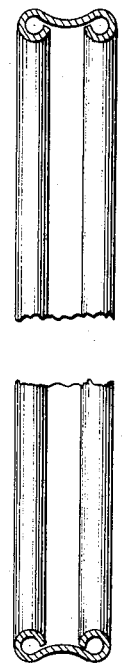
Fig. 21 is a sectional view of the ring shown in Fig. 20, taken substantially on the line 21—21 of the latter figure.
Figure 22:
Fig. 22 illustrates in final form a buffer made from the stock shown in Figs. 20 and 21.

Figs. 20, 21 and 22 illustrate the manner in which a buffer, of the cross section shown in Figs. 21 and 22, may be made from strip stock in accordance with certain features of the present process. In making this form of buffer, bar stock having rolled edges and an intermediate reverse bend, as shown in these figures, and other similar cross sections with highly polished surfaces, may be made by cold rolling strip stock of untempered and unhardened low carbon steel. A bar from this bar stock is rolled into ring form and plated in the manner described above, very little, if any, preliminary polishing of the ring being required before plating. After plating, the ring may be buffed and shaped into an end fold buffer, or into any other suitable form, by bending the ring in a cold state, or the ring may be heated, as above described, and formed into the final buffer state while in a heated condition. This modification of the present process is intended to form a relatively rigid buffer, and no final hardening or tempering of the metal is necessary. Fig. 22 illustrates an end fold buffer made from stock of this character.

Figure 23:
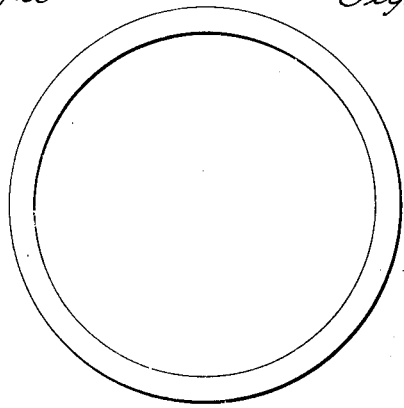
Figs. 23 and 24 illustrate respectively, in front and side elevation, an edge ring which may be formed from suitable stock in the manufacture of another form of buffer, in accordance with this process.
Figure 24:
Figure 25:
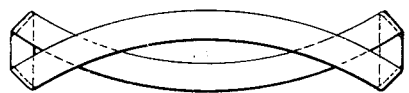
Fig. 25 illustrates a buffer shaped from the ring shown in Figs. 23 and 24.

The present process may be followed in the manufacture of various metallic articles, in which an edge ring is formed at one of the earlier stages in the process. Figs. 23 and 24 show such an edge ring which may be shaped into the buffer form shown in Fig. 25.

Fig. 26 shows another form of double-bar end fold buffer, in the manufacture of which the present process may be followed. This buffer requires a considerably longer piece of strip stock for its manufacture than that shown in Fig. 15, and when bent into ring form the ring will, of course, be of somewhat greater diameter than that formed in the manufacture of the buffer shown in the latter figure. A buffer of the form shown in these figures may be produced in the manner shown in Figs. 1 to 14, inclusive, except that in the shaping of the buffer after it is bent into the form shown in Fig. 15, the end portions of the buffer are bent rearwardly and inwardly into positions illustrated in Fig. 26.

Figs. 28 and 29 illustrate the manner in which a single-bar buffer may be manufactured in accordance with the present process. In making this form of buffer, a strip of suitable stock is rolled into ring form, as shown in Fig. 28, but the ends of the strip are preferably left unwelded. The ring formed in making a single bar buffer is of relatively small diameter and will be fairly stiff, so that it is not necessary to weld the ends together. This ring may be finished, plated and polished in the manner described above. After the finishing operations have been completed, the ring may be heated, bent into a single-bar buffer of the form shown in Fig. 29, or into any other suitable shape, and then hardened and tempered in the manner described above. Two buffer bars may be made in substantially the same manner by taking a strip of stock of the length required for the two bars. This strip is bent into ring form and the ends are preferably welded together, after which suitable operations may be performed on the ring to provide the same with a polished, plated surface. The ring may then be severed at the welded point and at a point diametrically opposite the weld, to form two semi-circular strips. The two parts of the ring thus formed may then be heated, bent into suitable buffer bar form, and hardened and tempered in the manner above described.

The present process may be followed in making a buffer of tubular stock of the character shown in Figs. 30 and 31. This tubular stock may be bent into ring form and formed into buffer shape in substantially the same manner as the buffer made of circular cross-section shown in Figs. 18 and 19.

Figs. 32 and 33 illustrate a bar of flattened tubular stock, from which a buffer may be formed in accordance with the present process. This flattened stock may be bent into ring form and formed into buffer shape, while cold, in substantially the same manner as the stock shown in Figs. 20, 21 and 22, or if desired the ring may be heated before being subjected to the shaping operation. Figs. 34 and 35 illustrate an end fold buffer made from stock of the character shown in Figs. 32 and 33.

It is to be understood that the present invention is not limited to a process in which the buffer or other article is plated at one stage in the operation thereon, and that it may be used in the manufacture of buffers which are not provided with plated surfaces. For example, a buffer may be made by bending a strip into ring form, rough polishing the ring, heating the ring in a bath of suitable salts, bending the ring into the desired buffer shape, and then quenching the same. The buffer may then be annealed by heating the same in a bath of suitable salts or in an open hearth furnace, and a coating of japan or enamel may then be applied to the surface of the buffer.

What I claim is:

1. The process of making automobile buffers and other articles, which comprises molding a strip of unhardened and untempered steel into ring form, performing one or more operations on the ring to provide the same with a finished surface, bending the ring into the desired shape, and hardening and tempering the steel.

2. The process of making automobile buffers and other articles, which comprises bending into ring form a strip of steel of the desired composition, performing one or more operations on the ring to provide the same with a finished surface, heating the entire ring to a predetermined temperature, and bending the ring into the desired shape.

3. The process of making automobile buffers and other articles, which comprises bending into ring form a strip of steel of the desired composition, performing one or more operations on the ring to provide the same with a finished surface, heating the ring in an oxygen free atmosphere and providing the same with a protective coating, and bending the ring into the desired shape while protected by said coating.

4. The process of making automobile buffers and other articles, which comprises molding a strip of unhardened and untempered steel into ring form, plating a surface of the ring, and thereafter bending the ring into the desired shape.

5. The process of making automobile buffers and other articles, which comprises molding a strip of unhardened and untempered steel into ring form, performing one or more operations on the ring to provide the same with a finished surface, heating the ring to a predetermined temperature, bending the ring into the desired shape, and hardening and tempering the steel.

6. The process of making automobile buffers and other articles, which comprises bending into ring form a strip of steel of the desired composition, performing one or more operations on the ring to provide the same with a finished surface, heating the ring in a bath of a protective coating material, and bending the ring into the desired shape while coated with said material.

7. The process of making automobile buffers, which consists in bending into ring form a strip of metal of the required length and cross section to form the article, securing the ends of the ring together, providing the metal of the ring with a finished surface, heating the ring in an oxygen-free atmosphere to a predetermined temperature, and providing the metal while heating the same with a coating which will protect the finish from exposure to air and shaping the metal while protected by said coating.

8. The process of making automobile buffers and other articles, which consists in bending a strip of steel of the desired composition into ring form, uniting the ends of the ring, and engaging diametrically opposite portions of the ring and forcing said portions apart to bring intermediate portions of the same into substantially parallel relations and to form curved portions connecting said intermediate portions of the ring.

9. The process of making automobile buffers and the like, which comprises forcing apart diametrically opposite points in a ring of metal to elongate the same, and twisting and folding the ring to bring the sides of the elongation into substantially lengthwise parallelism and into substantially edgewise alignment, and to form end folds in said elongation.

10. The process of making automobile buffers or the like, which consists in bending into ring form a strip of steel of the required length, cross section and composition, to form the buffer, welding the ends of the strip together, preparing the surface of the ring for plating, and plating the ring, heating the ring to a desired temperature in a salt bath which is chemically inert with respect to steel and which will coat the surface of the ring to prevent oxidation when it is withdrawn from the heating bath, completing the shaping of the buffer while coated with the protective coating, and then quenching it in a hardening bath.

11. That improvement in the art of making automobile buffers or the like, which consists in molding into ring form an unhardened and untempered strip of steel of the required dimensions and desired composition, finishing and plating the strip while in ring form, heating the plated ring to hardening temperature in a bath of fused material selected to provide an adherent protective coating on the ring when withdrawn from the bath, stretching the ring into elongated condition and folding over the ends thereof to bring the sides substantially into edgewise parallelism, quenching the buffer thus formed in a hardening bath, reducing the hardness by heating the buffer to the desired temperature in a second bath of similar material, and then letting the tempered buffer cool in the air while coated with an adherent coating of the material of the last-mentioned bath.

12. The process of making automobile buffers and similar articles which comprises heating a relatively thick narrow strip of unhardened and untempered steel in a bath of suitable salts to a temperature suitable for hardening the metal, bending the strip into the desired buffer or similar shape, plunging the strip into a suitable quenching bath immediately after the bending operation while still at hardening temperature imparted by said first bath and thereafter treating the strip to temper the same.

13. The process of making automobile buffers and the like, comprising the finishing of a strip of unhardened steel for the reception of a nickel or other coating, heating said strip in a fused salt bath to hardening temperature, bending the heated strip into bumper or other form while a coating of the fused salt remains thereon, plunging the same into an aqueous quenching medium which hardens the metal and removes the adherent coating of the salt therefrom, withdrawing the formed bumper or the like from the aqueous quenching medium and tempering the steel, thereafter cleaning and applying a finishing coating.

14. The process of making automobile bumpers and the like, which comprises heating a strip of unhardened steel in a fused salt bath to hardening temperature, bending the heated strip into bumper or other form while a coating of the fused salt remains thereon, plunging the same into an aqueous quenching medium which hardens the metal and removes the adherent coating of the salt therefrom, withdrawing the formed bumper or the like from the aqueous quenching medium and tempering the steel, thereafter cleaning and applying a finishing coating.

15. The process of making automobile bumpers and the like, comprising the rolling of a strip of unhardened steel into ring form, heating said ring in a fused salt bath to hardening temperature, bending the heated ring into bumper or other form while a coating of the fused salt remains thereon, plunging the same into an aqueous quenching medium which hardens the metal and removes the adherent coating of the salt therefrom, withdrawing the formed bumper or the like from the aqueous quenching medium and tempering the steel, thereafter cleaning and applying a finishing coating.

16. The process of making automobile bumpers and the like, comprising the finishing of a strip of unhardened steel for the reception of a nickel or other coating, heating said strip in a fused salt bath to hardening temperature, bending the heated strip into bumper or other form while a coating of the fused salt remains thereon, plunging the same into an aqueous quenching medium which hardens the metal and at the same time removes the adherent coating of the salt therefrom, withdrawing the formed bumper or the like from the aqueous quenching medium and tempering the steel, thereafter cleaning and applying a finishing coating.

17. The process of making automobile bumpers and the like, which comprises the rolling of a strip of unhardened steel into ring form, finishing the strip while in ring form for the reception of a nickel or other coating, heating said ring in a fused salt bath to hardening temperature, bending the ring into bumper or other form while a coating of the fused salt remains thereon, plunging the ring into an aqueous quenching medium which hardens the metal and removes the adherent coating of the salt therefrom, withdrawing the formed bumper or the like from the aqueous quenching medium and tempering the steel, thereafter cleaning and applying a finishing coating.

18. The process of making automobile bumpers or the like, comprising the rolling of a strip of unhardened steel into ring form, heating the ring in a fused salt bath to hardening temperature, and immersing the metal in a quenching bath to harden the same.

19. The process of making automobile bumpers or the like, which comprises smoothing one or more surfaces of a strip of unhardened steel, heating said strip in a fused salt bath to hardening temperature, bending the strip into the desired bumper or other form, and immersing the strip in a quenching bath to harden the metal.

20. The process of making automobile bumpers or the like, comprising smoothing one or more surfaces of a strip of unhardened steel, heating said strip in a fused salt bath to hardening temperature, and immersing the heated strip in a quenching bath to harden the metal.

21. A process of making automobile buffers which comprises heating a relatively narrow strip of unhardened and untempered steel suitable to form buffer bars in a fused salt bath to hardening temperature, bending the strip into buffer shape and placing the buffer in a suitable quenching bath while still at a hardening temperature imparted by said first bath.

22. A process of making automobile buffers which comprises heating a relatively narrow strip of unhardened and untempered steel suitable to form buffer bars in a fused salt bath to hardening temperature, bending the strip into buffer shape, subjecting the steel to the action of a chilling medium while still at a hardening temperature imparted by said bath and heating the steel in a second fused salt bath to temper the same.

23. A process of making automobile buffers which comprises heating a relatively narrow strip of unhardened and untempered steel suitable to form buffers bars in a fused salt bath to hardening temperature, bending the strip into buffer shape while at hardening temperature, plunging the strip into a suitable quenching bath immediately after the bending operation while still at hardening temperature imparted by said first bath and heating the strip in a fused salt bath to temper the same.

24. A process of making automobile buffers which comprises grinding surfaces of a strip of steel, plating the strip, heating the strip in a fused salt bath and bending the strip into the desired shape.

25. A process of making a double-bar buffer which comprises bending a strip of steel beyond its elastic limit into ring form so as to impart a permanent set to the metal and elongating the ring and bending the same into buffer shape.

26. A process of making double-bar buffers which comprises bending a relatively thick narrow strip of steel suitable to form buffer bars beyond its elastic limit into ring form so as to impart a permanent set to the metal and elongating the ring to form two buffer bars.

GEORGE ALBERT LYON.

CERTIFICATE OF CORRECTION.

Patent No. 1,966,453.                                                                             July 17, 1934.

GEORGE ALBERT LYON.

It is hereby certified that error appears in the printed specification of the above numbered patent requiring correction as follows: Page 3, line 27, for "seevral" read several; page 7, after line 83, insert the following as claim 18:

18. The process of making automobile bumpers or the like, which comprises rolling a strip of unhardened steel into ring form, finishing a surface of the ring, heating the ring in a fused salt bath to hardening temperature and immersing the metal in a quenching bath to harden the same.

Same page, lines 84 and 90, for the claim numbers 18 and 19, read 19 and 20; and same page, strike out lines 97 to 102, comprising claim 20 as printed; and that the said Letters Patent should be read with these corrections therein that the same may conform to the record of the case in the Patent Office.

Signed and sealed this 2nd day of October, A. D. 1934.

Leslie Frazer (Seal)                                                            Acting Commissioner of Patents.